(12) United States Patent
Kim et al.

(10) Patent No.: US 10,110,364 B2
(45) Date of Patent: Oct. 23, 2018

(54) METHOD FOR TERMINAL FOR TRANSMITTING UPLINK DATA IN FDR COMMUNICATION ENVIRONMENT

(71) Applicant: LG ELECTRONICS INC., Seoul (KR)

(72) Inventors: Kitae Kim, Seoul (KR); Jaehoon Chung, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 15/107,907

(22) PCT Filed: Dec. 15, 2014

(86) PCT No.: PCT/KR2014/012337
§ 371 (c)(1),
(2) Date: Jun. 23, 2016

(87) PCT Pub. No.: WO2015/099344
PCT Pub. Date: Jul. 2, 2015

(65) Prior Publication Data
US 2016/0323830 A1    Nov. 3, 2016

Related U.S. Application Data

(60) Provisional application No. 61/920,480, filed on Dec. 24, 2013.

(51) Int. Cl.
*H04L 5/14* (2006.01)
*H04W 72/08* (2009.01)
(Continued)

(52) U.S. Cl.
CPC .............. *H04L 5/14* (2013.01); *H04B 1/525* (2013.01); *H04L 1/0009* (2013.01);
(Continued)

(58) Field of Classification Search
CPC ..... H04L 5/14; H04L 1/0009; H04L 25/0226; H04L 5/0048; H04W 52/146;
(Continued)

(56) References Cited

U.S. PATENT DOCUMENTS 9,019,849 B2 *   4/2015   Hui ..................... H01Q 3/2611
                                                      370/252
9,225,493 B2 *  12/2015   He ........................ H04L 5/0066
(Continued)

FOREIGN PATENT DOCUMENTS

JP     2008067211       3/2008
JP     2013542642      11/2013
(Continued)

OTHER PUBLICATIONS

Renesas et al. "R1-113888 HARQ Procedure for Full Duplex Mode in CC specific TDD configuration", Nov. 14-18, 2011, 3GPP TSG-RAN WG1 Meeting #67 R1-113888, pp. 1-5.*
(Continued)

*Primary Examiner* — Un C Cho
*Assistant Examiner* — Shah Rahman
(74) *Attorney, Agent, or Firm* — Lee Hong Degerman Kang Waimey

(57) ABSTRACT

Disclosed are a method and a terminal for transmitting data, the method comprising the steps of: determining, during FDR communication with a base station, an overlap region from among a resource region for transmitting an uplink data channel, the overlap region being the resource region for a downlink control channel received from the base station; mitigating the effects of self-interference in the
(Continued)

overlap region due to an uplink communication; and transmitting the uplink data channel by means of the overlap region for which the effects of self-interference have been mitigated and the region excluding the overlap region from among the resource region for transmitting the uplink data channel.

10 Claims, 7 Drawing Sheets

(51) Int. Cl.
| | | |
|---|---|---|
| *H04B 1/525* | (2015.01) | |
| *H04L 1/00* | (2006.01) | |
| *H04L 5/00* | (2006.01) | |
| *H04L 25/02* | (2006.01) | |
| *H04W 52/14* | (2009.01) | |
| *H04W 72/04* | (2009.01) | |
| *H04W 52/24* | (2009.01) | |
| *H04W 88/02* | (2009.01) | |
| *H04W 88/08* | (2009.01) | |

(52) U.S. Cl.
CPC ........ *H04L 5/0048* (2013.01); *H04L 25/0226* (2013.01); *H04W 52/146* (2013.01); *H04W 72/042* (2013.01); *H04W 72/082* (2013.01); *H04W 52/24* (2013.01); *H04W 88/02* (2013.01); *H04W 88/08* (2013.01)

(58) Field of Classification Search
CPC . H04W 72/042; H04W 72/082; H04W 88/02; H04W 88/08; H04W 52/246; H04W 52/24; H04B 1/525
USPC ........................................................ 370/278
See application file for complete search history.

(56) References Cited

U.S. PATENT DOCUMENTS

| | | | | |
|---|---|---|---|---|
| 9,572,038 | B2* | 2/2017 | Khandani | ............. H04W 16/14 |
| 2008/0062896 | A1* | 3/2008 | Shirakabe | ................ H04B 7/26 370/278 |
| 2010/0022201 | A1 | 1/2010 | Vandenameele | |
| 2011/0038283 | A1 | 2/2011 | Yu et al. | |
| 2011/0143655 | A1* | 6/2011 | Ahn | .................... H04B 7/15542 455/9 |
| 2012/0063369 | A1* | 3/2012 | Lin | .................... H04B 7/15542 370/279 |
| 2012/0063373 | A1 | 3/2012 | Chincholi et al. | |
| 2012/0155336 | A1 | 6/2012 | Khojastepour et al. | |
| 2012/0201173 | A1* | 8/2012 | Jain | ......................... H04B 1/525 370/277 |
| 2012/0250526 | A1* | 10/2012 | Zhao | .................... H04B 7/2606 370/243 |
| 2013/0083672 | A1 | 4/2013 | Johansson et al. | |
| 2013/0114468 | A1* | 5/2013 | Hui | ...................... H01Q 3/2611 370/277 |
| 2013/0155912 | A1* | 6/2013 | Khojastepour | ... H04W 72/0413 370/277 |
| 2013/0188530 | A1 | 7/2013 | Pirskanen et al. | |
| 2013/0223294 | A1 | 8/2013 | Karjalainen et al. | |
| 2013/0286903 | A1 | 10/2013 | Khojastepour et al. | |
| 2013/0301488 | A1* | 11/2013 | Hong | ...................... H04B 1/56 370/278 |
| 2015/0180640 | A1* | 6/2015 | Liu | ........................ H04B 1/525 370/278 |
| 2015/0229461 | A1* | 8/2015 | DiFazio | ................... H04L 5/14 370/280 |
| 2016/0234003 | A1* | 8/2016 | Wang | ................. H04W 72/0446 |
| 2016/0330011 | A1* | 11/2016 | Lee | ....................... H04L 5/0066 |

FOREIGN PATENT DOCUMENTS

| | | |
|---|---|---|
| JP | 2015524212 | 8/2015 |
| WO | 2013185106 | 12/2013 |
| WO | 2015094914 | 6/2015 |

OTHER PUBLICATIONS

Samsung, "Full duplex multiplexing of Un and Uu subframes", 3GPP TSG RAN WG1 Meeting #60, R1-101197, Feb. 2010, 3 pages.

NTT Docomo, "Deployment scenarios and interference mitigation schemes for eIMTA", 3GPP TSG RAN WG1 Meeting #72, R1-130755, Feb. 2013, 8 pages.

PCT International Application No. PCT/KR2014/012324, Written Opinion of the International Searching Authority dated Mar. 25, 2015, 16 pages.

PCT International Application No. PCT/KR2014/012337, Written Opinion of the International Searching Authority dated Mar. 25, 2015, 17 pages.

\* cited by examiner (a)  (b)

(a)  (b)

METHOD FOR TERMINAL FOR TRANSMITTING UPLINK DATA IN FDR COMMUNICATION ENVIRONMENT

CROSS-REFERENCE TO RELATED APPLICATIONS

This application is the National Stage filing under 35 U.S.C. 371 of International Application No. PCT/KR2014/012337, filed on Dec. 15, 2014, which claims the benefit of U.S. Provisional Application No. 61/920,480, filed on Dec. 24, 2013, the contents of which are all hereby incorporated by reference herein in their entirety.

TECHNICAL FIELD

The present invention relates to a method of transmitting uplink data by a UE by mitigating self-interference thereof in an environment in which a base station and the UE perform FDR communication.

BACKGROUND ART

A base station (BS) or a mobile terminal performs communication using a frequency division duplex (FDD) scheme, in which a transmission/reception resource of a signal is divided into frequencies, and a half duplex radio (HDR) scheme which employs a time division duplex (TDD) scheme, in which the transmission/reception resource is divided into time slots.

However, in the HDR communication scheme, transmission and reception cannot be performed simultaneously within the same frequency/time resource. Accordingly, introduction of the FDR communication scheme has been proposed for more efficient resource use. FDR communication refers to a scheme in which a BS or a terminal performs transmission and reception operations simultaneously using a resource of the same time-frequency region.

In FDR communication environments, since a BS and a terminal simultaneously perform transmission and reception using the same time-frequency resources, a signal transmitted from the BS or terminal is received through a reception antenna of the same BS or terminal, that is, self-interference is generated. Self-interference must be cancelled in order to guarantee FDR communication performance since a signal transmitted through a transmission antenna of a BS or a terminal is directly received through a reception antenna thereof and thus signal intensity is very high. Various schemes have been proposed in order to efficiently cancel such self-interference.

DISCLOSURE

Technical Problem

An object of the present invention devised to solve the problem lies in reduction of self-interference generated in FDR communication environments to guarantee smooth communication between a BS and a terminal.

Another object of the present invention is to provide a scheme in which a UE receives a control channel with stability by reducing the influence of self-interference thereof on a specific resource region when transmitting uplink data.

Yet another object of the present invention is to dynamically cancel self-interference according to communication environment variation by mitigating the influence of self-interference through various methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of transmitting data includes: determining an overlap region corresponding to a resource region of a downlink control channel received from a base station (BS) during FDR communication with the BS, from among resource regions for transmission of an uplink data channel; mitigating an influence of self-interference caused by uplink communication on the overlap region; and transmitting the uplink data channel through the overlap region in which the influence of self-interference has been mitigated and a region other than the overlap region, from among the resource regions for transmission of the uplink data channel.

The mitigating of self-interference may include decreasing uplink transmit (Tx) power for the overlap region.

The mitigating of self-interference may include controlling the uplink Tx power to be lower than a predetermined threshold value.

The mitigating of self-interference may include controlling the uplink Tx power in consideration of self-interference cancellation performance of the UE.

The uplink Tx power may increase as the self-interference cancellation performance increases.

The mitigating of self-interference may include controlling the uplink Tx power in consideration of self-interference cancellation performance of the BS in addition to the self-interference cancellation performance of the UE.

The transmitting of the uplink data channel may include transmitting information about the controlled uplink Tx power along with the uplink data channel.

The transmitting of the uplink data channel may include allocating a channel estimation reference signal to the overlap region, the channel estimation reference signal being discriminated form that allocated to a region other than the overlap region, wherein the BS demodulates uplink data according to the controlled uplink Tx power by compensating for the uplink data channel transmitted through the overlap region through a channel estimated using the reference signal.

The mitigating of self-interference may include adjusting a modulation and coding scheme (MCS) level with respect to the overlap region.

The mitigating of self-interference may include applying, to the overlap region, an MCS with lower efficiency than that for a region other than the overlap region.

The mitigating of self-interference may include adjusting the MCS level in consideration of an effective signal-to-interference-and-noise ratio (SINR) determined on the basis of the following Equation, $$\text{effective } SINR = \frac{S_P \cdot q + S_N \cdot (1-q)}{I+N},$$

In the equation, $S_P$ indicates Tx power set to the overlap region, $S_N$ indicates Tx power set to the region other than the overlap region, q represents a ratio of the overlap region to the resource regions for transmission of the uplink data channel, I represents interference caused by FDR communication, and N represents noise caused by FDR communication.

In another aspect of the present invention, a UE for transmitting uplink data in an FDR communication environment includes: a transmitter; a receiver; and a processor connected to the transmitter and the receiver to transmit uplink data, wherein the processor determines an overlap region corresponding to a resource region of a downlink control channel received from a BS during FDR communication with the BS, from among resource regions for transmission of an uplink data channel, mitigates an influence of self-interference caused by uplink communication on the overlap region and controls the transmitter to transmit the uplink data channel through the overlap region in which the influence of self-interference has been mitigated and a region other than the overlap region, from among the resource regions for transmission of the uplink data channel.

Advantageous Effects

According to embodiments of the present invention, the following advantages can be obtained.

Firstly, self-interference generated according to uplink communication of a UE in FUR communication environments can be minimized.

Secondly, self-interference of a UE, which affects a specific resource region from among resource regions for uplink data transmission, can be cancelled and thus the UE can stably receive control channels from a BS.

Thirdly, various self-interference cancellation schemes are proposed such that a UE can efficiently cancel self-interference according to communication environment variation.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Figure 1:
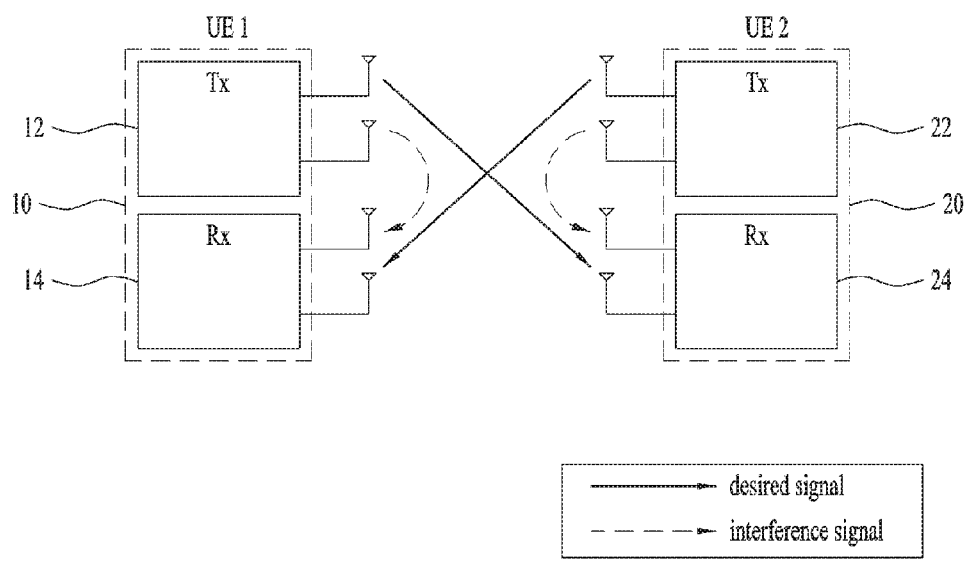
FIG. 1 illustrates an FDR communication environment.

Although the terms used in this specification are selected, as much as possible, from general terms that are widely used at present while taking into consideration the functions of the elements obtained in accordance with one embodiment, these terms may be replaced by other terms based on intentions of those skilled in the art, customs, emergence of new technologies, or the like. In addition, in certain instances, terms that are arbitrarily selected by the applicant may be used. In this case, meanings of these terms will be disclosed in detail in the corresponding part of the description of the invention. Accordingly, the terms used herein should be defined based on practical meanings thereof and the whole content of this specification, rather than based on names of the terms.

The embodiments described below are constructed by combining elements and features of the present invention in a predetermined form. The elements or features may be considered selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features from another embodiment.

In describing the drawings, procedures or steps, which may obscure the main point of the present invention, will not be described nor will description of procedures or steps, which may be understood by those having ordinary skill in the art, be given.

In this specification, "comprise" or "include" should be understood as not precluding existence of one or more other constituents, if not stated otherwise. In addition, the terms "unit", "-er", "module", etc. signify a unit that processes at least one function or operation and may be implemented in hardware, software, or a combination of hardware and software. As used in the specification and appended claims, the terms "a", "an", "one", "the" and other similar terms include both singular and plural forms, unless context clearly dictates otherwise.

In this specification, embodiments of the present invention are described, focusing on the relationship between a base station (BS) and a mobile station (MS) in transmission/reception of data. Herein, the base station serves as a terminal node of a network that directly performs communication with mobile stations. In this document, an operation described as being performed by the base station may be performed by an upper node of the base station in some cases.

That is, in a network comprised of a plurality of network nodes including a BS, various operations performed for communication with an MS may be performed by the BS, or network nodes other than the BS. The term "base station" may be replaced with the terms "fixed station", "Node B", "eNode B (eNB)", "advanced base station (ABS)", or "access point".

In addition, the term "mobile station (MS)" may be replaced with a term "user equipment (UE)", "subscriber station (SS)", "mobile subscriber station (MSS)", "mobile terminal", "advanced mobile station (AMS)", or "terminal". Particularly, the term mobile station used in this specification may have same meaning as the term machine-to-machine device.

A transmitter refers to a fixed and/or mobile node that provides a data service or a voice service, and a receiver refers to a fixed and/or mobile node that receives a data service or a voice service. Therefore, an MS may serve as a transmitter and a BS may serve as a receiver, on uplink. Likewise, the MS may serve as a receiver and the BS may serve as a transmitter, on downlink.

Communication between a device and "a cell" may refer to transmission and reception between the device and a BS of the cell. That is, while a target to/from which the device transmits/receives signals may be a specific BS, transmission/reception between the device and the specific BS can be described as transmission/reception between the device and the cell formed by the specific BS for convenience. Similarly, "a macro cell" and/or "a small cell" may refer to not only coverages thereof but also "a macro BS supporting the macro cell" and/or "a small cell BS supporting the small cell".

The embodiments of the present invention may be supported by standard documents disclosed for at least one of an Institute of Electrical and Electronics Engineers (IEEE) 802.xx system, a 3rd Generation Partnership Project (3GPP) system, a 3GPP Long Term Evolution (LTE) system, a 3GPP LTE-Advanced (LTE-A) system, and a 3GPP2 system, which are wireless access systems. That is, obvious steps or portions which are not described in the embodiments of the present invention may be supported by the above documents.

All terms used herein may be explained by the standard documents. Particularly, the embodiments of the present invention may be supported by at least one of P802.16e-2004, P802.16e-2005, P802.16.1, P802.16p, and P802.16.1b, which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In the following description of the embodiments of the present invention, specific terms are used in order to provide a thorough understanding of the present invention. These terms may be changed without departing from the spirit of the present invention.

1. FDR Communication

FIG. 1 illustrates an FDR communication environment. As described above, in an FDR communication environment, a BS and a UE performs uplink or downlink communication using the same frequency/time resources.

As shown in FIG. 1, since UE 1 10 and UE 2 20 perform communication using the same frequency/time resources in the FUR communication environment, each UE needs to simultaneously perform reception of a signal transmitted from a BS or the other UE and transmission of a signal thereto. Accordingly, a communication environment in which signals transmitted through transmission antennas 12 and 22 of UE 1 10 and UE 2 20 are directly input to reception antennas 14 and 24 thereof to cause self-interference is formed, as represented by dotted lines in FIG. 1.

Figure 2:
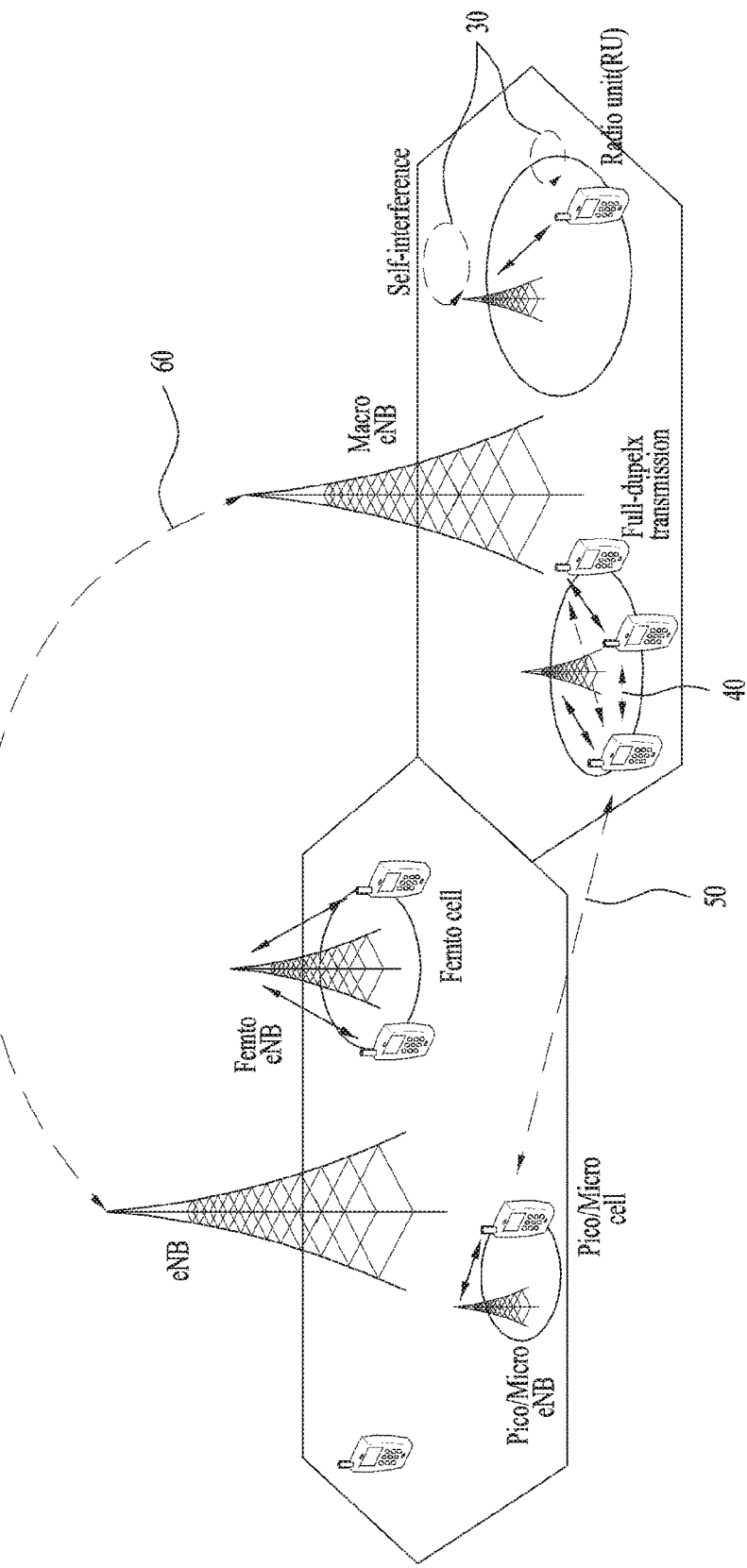
FIG. 2 is a view for explaining interference generated in an FDR communication environment.

FIG. 2 is a view for explaining interferences generated in an FDR communication environment.

FIG. 2 shows a multi-cell environment in which a macro cell formed by a macro BS and small cells (pico/femto/micro cells) formed by pico/femto/micro BSs coexist. When FDR communication is performed in such multi-cell environment, various interferences need to be considered. Referring to FIG. 2, self interference or self-user interference, multi-user interference and inter-BS interference need to be considered according to introduction of FDR communication.

First, regarding the self-interference, the transmitter and receiver of a UE or a BS performs transmission and reception using the same time/frequency resource. Since the transmitter and receiver are positioned close to each other, a signal transmitted from a UE or a BS may be introduced into the receiver of the same UE or BS. In FIG. 2, reference numeral 30 denotes self-interference of the BS and UEs.

Next, the multi-user interference may occur when two or more UEs positioned close enough to affect each other communicate with each other using the same time/frequency resource. FIG. 2 exemplarily shows multi-user interference 40 and 50 occurring between UEs according to FDR communication therebetween.

Lastly, inter-BS interference, which is similar to the aforementioned multi-user interference, may occur between two or more BSs. FIG. 2 shows inter-BS interference 60.

As described above, while FDR communication can increase frequency efficiency by sharing the same time/frequency resources on uplink/downlink, frequency efficiency enhancement may be restricted due to interference increase.

2. Self-Interference

From among interferences generated according to FDR communication, self-interference is received with high intensity of approximately 60 to 90 dB compared to intensity of a desired signal. Since self-interference considerably affects signal processing of a receiving end compared to other types of interference, a process of cancelling self-interference is very important in FDR communication. A description will be given of a method of cancelling self-interference in FDR communication.

Figure 3:
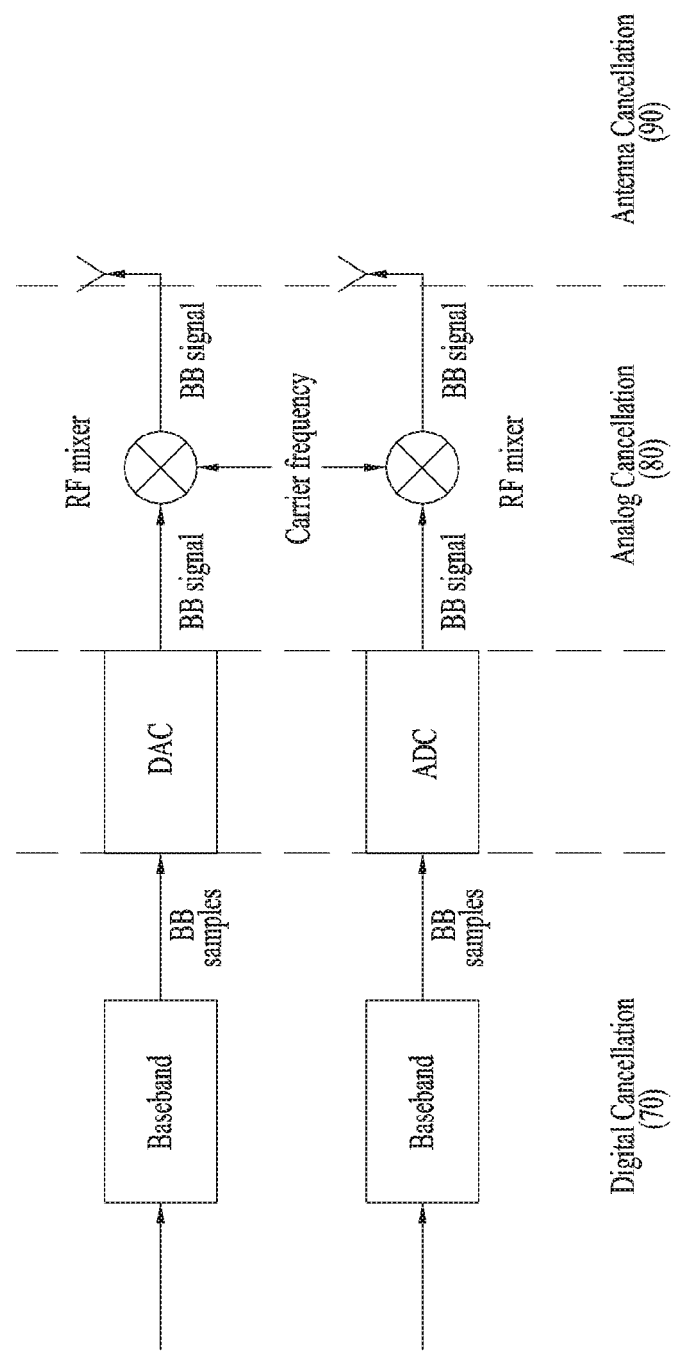
FIG. 3 illustrates methods for cancelling interference in an FDR communication environment.

FIG. 3 illustrates methods for cancelling interference in an FDR communication environment.

In FIG. 3, as methods for cancellation of self-interference, digital cancellation 70, which is applied before signals processed in a base band pass through a digital-to-analog converter (DAC) (or after reception signals pass through an analog-to-digital converter (ADC)), analog cancellation 80, which is applied after a transmission signal passes through a DAC (or before a reception signal passes through an ADC), and antenna cancellation 90 of cancelling an aggregate signal received through a transmit antenna by adjusting the distances between two or more transmit antennas are proposed.

Figure 4:
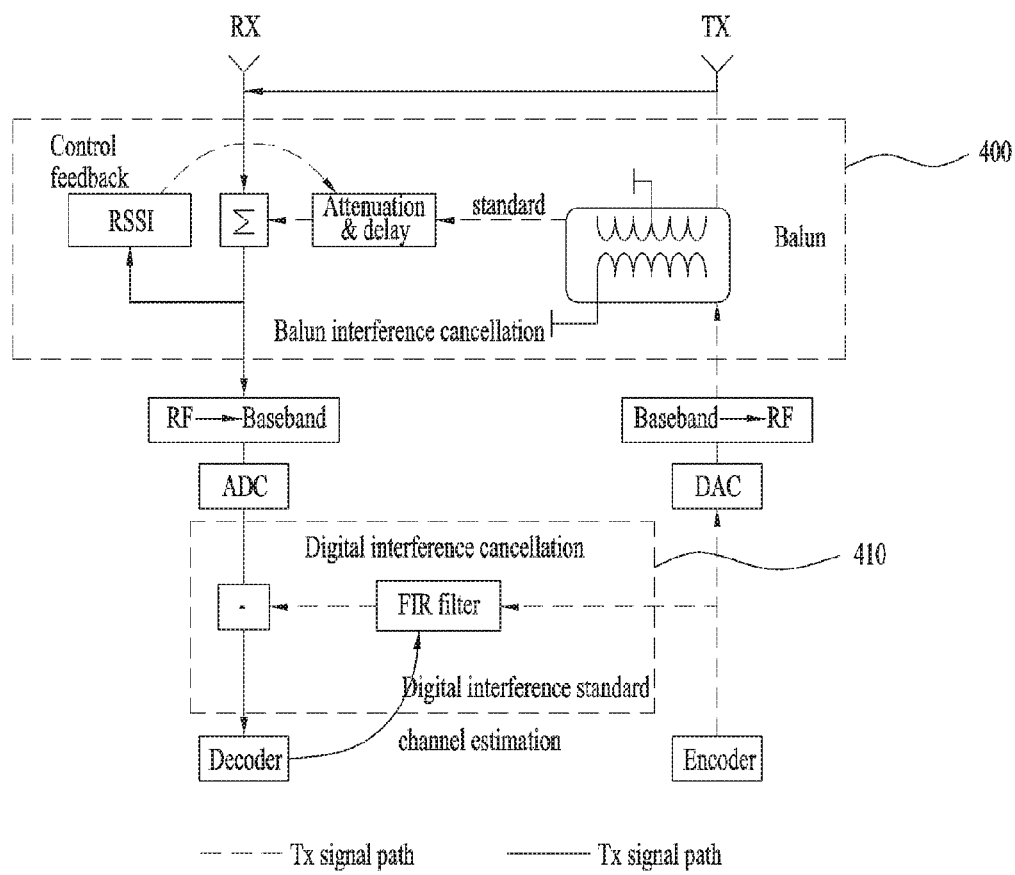
FIG. 4 illustrates digital interference cancellation and analog interference cancellation for canceling interference in an FDR communication environment.

FIG. 4 illustrates digital interference cancellation and analog interference cancellation for cancelling interference in FDR communication. In the case of digital cancellation 410, various techniques such as beamforming may be applied to cancel self-interference, and the range of interference cancellation may be between about 20 dB and 25 dB.

In analog cancellation 400, which is implemented in a second chain of transmit chains that is between the digital cancellation and the antenna cancellation, interference cancellation signals are directly created through digital estimation of self-interference and summed in the receiver. That is, the analog cancellation may be implemented such that directly received transmission/reception signals are cancelled by adding a signal produced by inverting a signal of the transmitter to a signal of the receiver. The maximum value of cancellation range of the antenna cancellation may be 45 dB.

Figure 5:
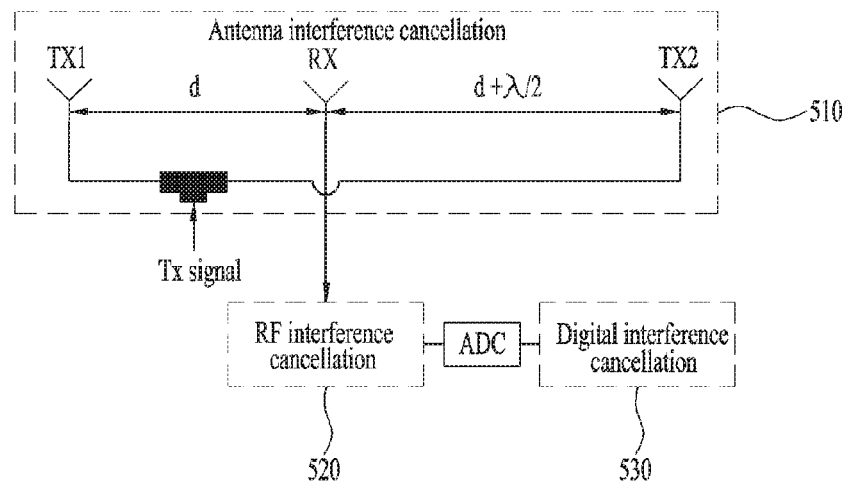
FIG. 5 illustrates antenna interference cancellation for cancelling interference in an FDR communication environment.

FIG. 5 illustrates antenna interference cancellation for cancelling interference in an FDR communication environment.

In antenna cancellation 510, a transceiver configured with two transmit antennas and one receive antenna causes signals transmitted from the two transmit antennas to have phases inverted by 180 degrees when the signals are introduced into the receive antenna. Thereby, antenna cancellation may be implemented such that the phase difference between the signals transmitted from the two transmit antennas becomes 180 degrees. Thereby, the aggregate signal received by the received antenna positioned between the transmit antennas may become null, i.e., 0. In other words, if the two transmit antennas are spaced apart from the receive antenna such that the distance between one transmit antenna and the receiver differs by $\lambda/2$ from the distance between the other transmit antenna and the receive antenna, the phases of the signals input to the receive antenna differ from each other by exactly 180 degrees.

In general, the antenna cancellation technique has low complexity and is thus easiest to implement. However, the maximum interference cancellation performance of the antenna cancellation technique is about 20-30 dB, while a self-interference cancellation performance of about 70 dB is required for the FDR system. Accordingly, self-interference cancellation may be achieved through a combination of the aforementioned three techniques 510, 520 and 530. However, there is a specific communication environment in which the performance of antenna cancellation can be maximized.

Figure 6:
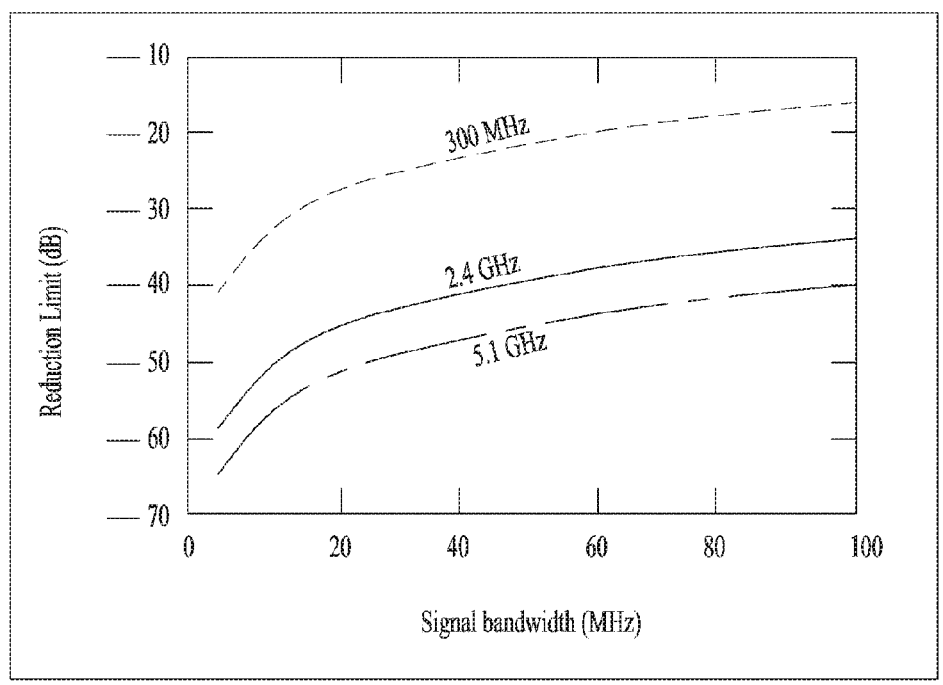
FIG. 6 illustrates interference cancellation efficiency according to antenna interference cancellation in an FDR communication environment.

FIG. 6 illustrates interference cancellation efficiency according to antenna interference cancellation in an FDR communication environment.

As shown in FIG. 6, as system bandwidth decreases and the center frequency is shifted to a higher frequency, the performance of antenna cancellation drastically increases. Accordingly, if a narrow high frequency band is allocated to the FDR communication region, sufficient performance of self-interference cancellation may be ensured by the antenna cancellation technique alone. Accordingly, FDR performance may be ensured, and implementation complexity may also be lowered. A high frequency band of transmission is directed to broadband communication, in which transmission is implemented using a wide frequency band. Accordingly, if a region of the high frequency band of transmission is set as a band for FDR communication, an environment advantageous for self-interference cancellation through antenna cancellation may be created, and thus sufficient performance of self-interference cancellation may be achieved.

3. Self-Interference Mitigation Scheme

As described above, self-interference is caused by direct introduction of a signal, transmitted from a UE or a BS, to a receiver of the same UE or BS. Accordingly, it is necessary to reduce self-interference generated in a region where a resource region used for a BS to transmit a downlink control channel overlaps a resource region used for a UE to transmit an uplink data channel.

A description will be given of a method of cancelling interference applied from a data channel transmitted on uplink from a UE to a control channel transmitted on downlink from a BS in an FDR communication environment.

Figure 7:
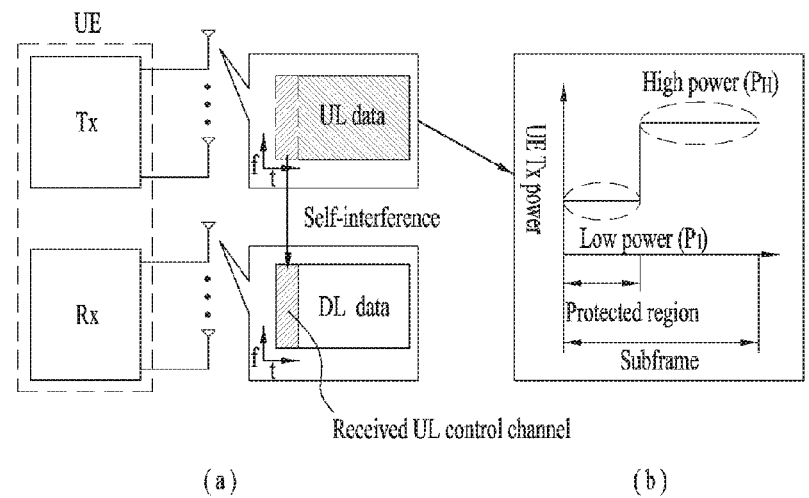
FIG. 7 illustrates a method of mitigating the influence of self-interference on an overlap region according to an embodiment of the present invention.

An uplink data channel transmitted from a UE is directly applied to a receiver of the UE in an FDR communication environment, as shown in FIG. 7, generating self-interference. Accordingly, detection accuracy of a downlink control channel, which is received by the UE from a BS, decreases due to self-interference from the uplink data channel of the UE.

Various interference cancellation schemes for canceling such self-interference can be applied as described above. However, there is a limitation on application of digital interference cancellation and analog interference cancellation which perform beamforming on the downlink control channel that needs to be commonly received by UEs. Accordingly, in embodiments illustrated in FIGS. 7 and 8, it is necessary to protect a region overlapping with the downlink control channel in time/frequency regions when the UE transmits an uplink data channel such that the UE can stably receive the downlink control channel from the BS.

In the following description, a resource region overlapping with a resource region allocated to a downlink control channel, from among resource regions allocated for uplink data channel transmission, is referred to as an "overlap region". An overlap region is specified by the position, size and arrangement structure of a specific region from among time/frequency resource regions used by a UE for uplink data channel transmission.

Prior to protection of an overlap region from the influence of self-interference of a UE, the UE needs to receive information about the overlap region from a BS. That is, upon determination of a resource region corresponding to a downlink control channel to be transmitted to the UE, the BS sets the resource region to an overlap region and transmits information about the overlap region to the UE. The information about the overlap region may be broadcast from the BS to one or more UEs and transmitted periodically or semi-statically.

A description will be given of a method of protecting an overlap region after a UE receives information about the overlap region from a BS, that is, a method of mitigating the influence of self-interference on the overlap region, with reference to FIGS. 7, 8 and 9.

FIG. 7 illustrates a method of mitigating the influence of self-interference on an overlap region according to an embodiment of the present invention. The overlap region is described with reference to FIG. 7(a) and an embodiment in which a UE controls transmit (Tx) power of the overlap region is described with reference to FIG. 7(b).

As described above, the overlap region corresponding to a resource region of a downlink control channel, from among resource regions for uplink data channel transmission of the UE, needs to be protected from self-interference caused by uplink transmission of the UE. Accordingly, the UE can set different Tx power values for an overlap region and a non-overlap region from among uplink resource regions.

Referring to FIG. 7(b), the UE sets uplink data channel Tx power to $P_L$ for a region (i.e. overlap region) that needs to be protected from self-interference. The Tx power is a value lower than a Tx power value $P_H$ of a resource region other than the overlap region, from among the resource regions for uplink transmission.

When the UE sets the uplink Tx power for the overlap region to a low value, the influence of self-interference caused by the uplink data channel transmitted through the overlap region is reduced. That is, the signal magnitude of the self-interference component decreases as Tx power decreases, and thus accuracy of detection of the downlink control channel by the UE increases.

For example, the UE can reduce the Tx power for the overlap region to below a predetermined threshold value. An uplink Tx power value $P_{TH}$ for the overlap region, which is controlled by the UE for stable control channel reception, is transmitted from the BS to the UE. That is, the UE can receive information about the Tx power threshold value $P_{TH}$ broadcast by the BS and control the uplink Tx power value on the basis of the information. Alternatively, the UE may determine $P_{TH}$ according to communication state.

The UE may consider self-interference cancellation (SIC) performance thereof when controlling the Tx power for the overlap region. Higher SIC performance of the UE means that a larger amount of self-interference affecting the overlap region can be cancelled even if the uplink data channel is transmitted with the same power. Accordingly, when SIC performance of the UE increases, the same self-interference cancelation result can be obtained even though the uplink data channel Tx power is less reduced. In other words, SIC performance may be inversely proportional to the value for controlling the uplink Tx power of the UE to decrease.

While the UE may have information about SIC capability thereof, the information may be broadcast by the BS and received by the UE. That is, the BS may obtain information about SIC performance of each UE connected thereto through feedback of the information and transmit information about SIC performance to a corresponding UE periodically or at the request of the UE. Alternatively, the BS may determine an uplink Tx power value to be controlled by a UE on the basis of previously acquired information about SIC performance of UEs and notify the UE of the Tx power value determined in consideration of SIC performance of the UE.

The following table 1 shows control of a Tx power value for an overlap region by a UE in consideration of SIC performance according to the aforementioned embodiment.

TABLE 1

| Configuration index | UE SIC performance | Tx power in overlap region | Tx power in other region |
|---|---|---|---|
| 1 | $-100$ dB $\leq C_{SIC-UE} \leq -90$ dB | $P_{max}/2$ | $P_{max}$ |
| 2 | $-90$ dB $\leq C_{SIC-UE} \leq -80$ dB | $P_{max}/4$ | $P_{max}$ |

TABLE 1-continued

| Configuration index | UE SIC performance | Tx power in overlap region | Tx power in other region |
|---|---|---|---|
| 3 | $-80$ dB $\leq C_{SIC-UE} \leq -70$ dB | $P_{max}/6$ | $P_{max}$ |
| ... | ... | ... | ... |

The UE may consider SIC performance of the BS as well as SIC performance thereof when controlling the Tx power for the overlap region. Control of uplink data channel Tx power by the UE means receive (Rx) power change in the BS. Accordingly, when the UE controls the uplink Tx power, uplink data channel reception accuracy in the BS may vary.

In FDR communication, the BS is also affected by self-interference due to downlink control channel transmission. Accordingly, the UE can control the uplink data channel Tx power in consideration of SIC performance of the BS to prevent abrupt Tx power control. The following table 2 shows control of uplink data channel Tx power by the UE in consideration of both SIC capacities of the UE and the BS.

TABLE 2

| Configuration index | UE SIC performance | BS SIC performance | Tx power in overlap region | Tx power in other region |
|---|---|---|---|---|
| 1 | $-100$ dB $\leq C_{SIC-UE} \leq -90$ dB | $-100$ dB $\leq C_{SIC-BS} \leq -90$ dB | $(P_{max}/2) * 1.0$ | $P_{max}$ |
| | | $-90$ dB $\leq C_{SIC-BS} \leq -80$ dB | $(P_{max}/2) * 0.8$ | $P_{max}$ |
| | | $-80$ dB $\leq C_{SIC-BS} \leq -70$ dB | $(P_{max}/2) * 0.6$ | $P_{max}$ |
| 2 | $-90$ dB $\leq C_{SIC-UE} \leq -80$ dB | $-100$ dB $\leq C_{SIC-BS} \leq -90$ dB | $(P_{max}/4) * 1.0$ | $P_{max}$ |
| | | $-90$ dB $\leq C_{SIC-BS} \leq -80$ dB | $(P_{max}/4) * 0.8$ | $P_{max}$ |
| | | $-80$ dB $\leq C_{SIC-BS} \leq -70$ dB | $(P_{max}/4) * 0.6$ | $P_{max}$ |
| ... | ... | ... | ... | ... |

Figure 8:
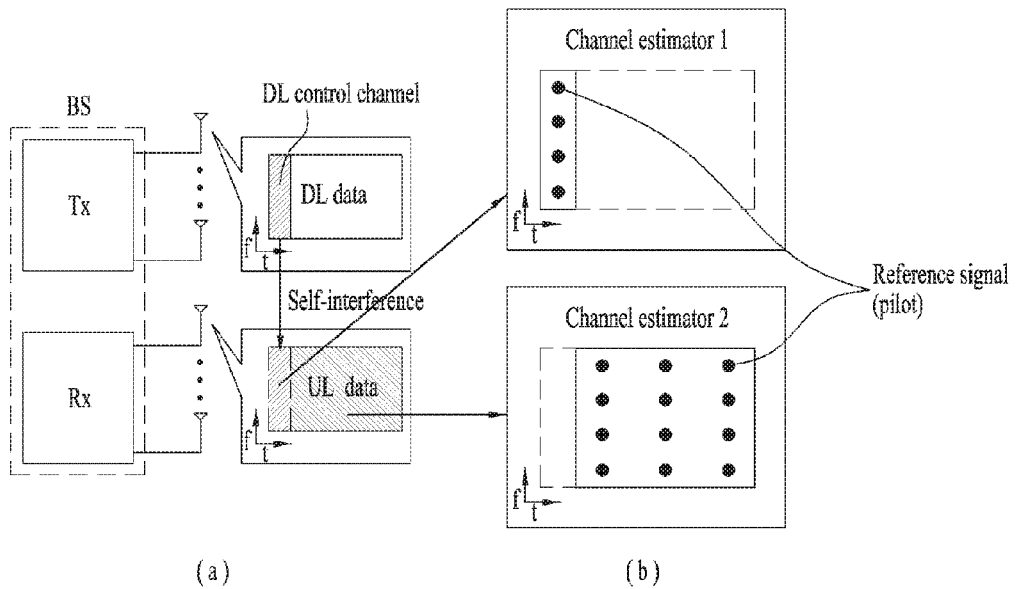
FIG. 8 illustrates a method of mitigating the influence of self-interference on an overlap region according to another embodiment of the present invention.

FIG. 8 illustrates a method of mitigating the influence of self-interference on an overlap region according to another embodiment of the present invention. A description will be given of an embodiment in which a UE transmits an additional reference signal for channel estimation with respect to an overlap region while controlling uplink Tx power for the overlap region with reference to FIG. 8.

When there is a difference between Tx power values of an overlap region and a non-overlap region from among resource regions for uplink data channel transmission, the UE transmits information about the power difference to the BS such that the BS can recognize the power difference. That is, the BS can compensate for the uplink data channel received with adjusted Tx power from the UE by receiving the information about the Tx power difference.

Specifically, no problem is generated when there is no difference between Tx power for the overlap region and Tx power for a non-overlap region. However, the BS detects a symbol constellation differently when the Tx power for the overlap region has been adjusted. Accordingly, to correctly detect and decode a data channel received from the UE, the BS needs to know a correct Tx power value and the UE transmits information about how the Tx power value has been adjusted to the BS. For example, the UE can configure feedback information about the Tx power value and transmit the feedback information to the BS or select a method of allocating an independent reference signal per uplink data channel region.

Specifically, the UE may feed back a Tx power difference between an overlap region and a non-overlap region from among resource regions of an uplink data channel to the BS. That is, the UE may directly transmit a Tx power value $P_L$ for the overlap region to the BS or transmit a Tx power difference $P_D$ ($P_D = P_H - P_L$) between the overlap region and the non-overlap region to the BS. In the first case, the BS detects a received signal by performing power scaling based on an adjusted power value only on the overlap region while applying an existing channel estimation process thereto.

In the second case, the UE may transmit channel estimation reference signals, which can be discriminated from each other for the overlap region and the non-overlap region, while transmitting the uplink data channel That is, the BS compensates for and demodulate a received channel through a channel independently estimated in a resource region allocated to each data channel.

Accordingly, when the UE allocates different reference signals to the overlap region and the non-overlap region and transmits the reference signals, the BS can demodulate a received signal even when the BS does not have information about an adjusted Tx power value. As shown in FIG. 8, the UE configures different reference signals (pilot signals) for the overlap region and the non-overlap region and transmits the reference signals such that the BS can correctly demodulate a received signal without having information about an adjusted Tx power value. The BS can demodulate the reference signals to detect received signals with respect to the overlap region and the non-overlap region by applying different channel estimators to the overlap region and the non-overlap region. In the second embodiment, process efficiency may be deteriorated due to overhead since the UE needs to additionally allocate a reference signal for the overlap region.

While the embodiment in which the UE controls Tx power of an overlap region has been described, the UE may perform a method of protecting an overlap region from self-interference.

Figure 9:
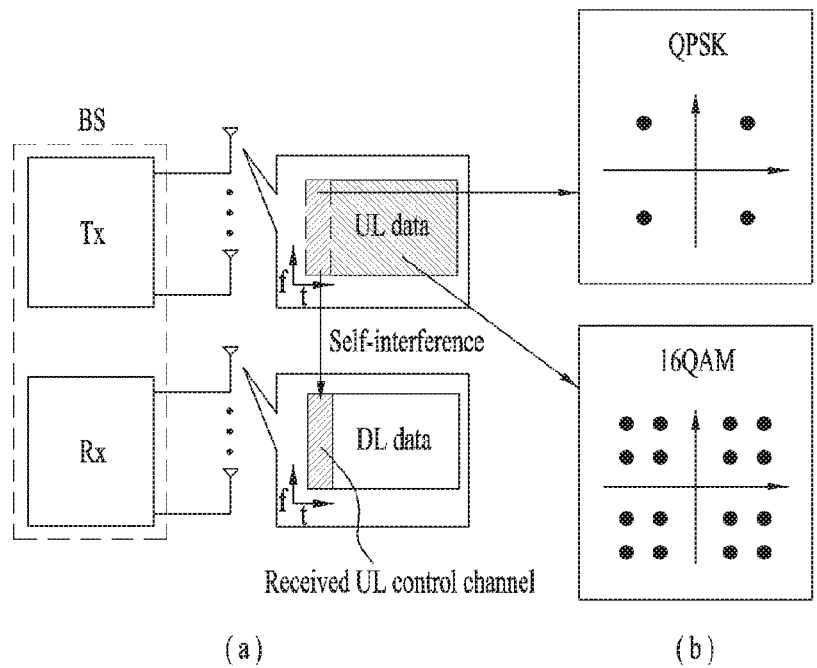
FIG. 9 illustrates a method of mitigating the influence of self-interference on an overlap region according to another embodiment of the present invention.

FIG. 9 illustrates a method of mitigating the influence of self-interference on an overlap region according to another embodiment of the present invention. A description will be given of an embodiment in which the UE controls a modulation and coding scheme (MCS) level of an overlap region with reference to FIG. 9.

The UE may apply different MCSs to an overlap region and a non-overlap region. For example, the UE can modulate the overlap region using QPSK and modulate the non-overlap region using 16QAM. That is, the UE can select an MCS for the overlap region such that the overlap region is less affected by self-interference even if transmission efficiency decreases.

MCS is associated with the aforementioned Tx power. That is, when the UE transmits the signal corresponding to the overlap region with reduced Tx power, the BS receives the signal with low power. Accordingly, Euclidian distance of demodulated symbols decreases with respect to the overlap region and thus it is necessary to select an MCS for the overlap region, which is different from an MCS for other regions. Therefore, the UE can control an MCS level as well as Tx power for the overlap region.

For example, the UE can select an MCS level in consideration of SNR or SINR with respect to the overlap region. In general, SNR or SINR is considered to determine an MCS and a coding rate for a given resource region. In determination of SNR or SINR, the UE can derive effective SINR in consideration of the ratio of an overlap region to a non-overlap region from among resource regions for uplink data channel transmission. The effective SINR refers to SINR considering distinct characteristics of the FDR communication environment in which self-interference occurs, distinguished from a communication environment in which SNR or SINR is derived on the basis of an uplink reference signal or a downlink reference signal.

The effective SINR can be determined as represented by Equation 1.

$$\text{effective } SINR = \frac{S_P \cdot q + S_N \cdot (1-q)}{I+N} \qquad \text{[Equation 1]}$$

$\begin{cases} S_P: \text{Tx power in overlapping region} \\ S_N: \text{Tx power in other data } tx \text{ region} \\ q(0 \le q \le 1): \text{Overlapping portion of the total resource} \end{cases}$ In Equation 1, "q" indicates the ratio of the overlap region to total uplink resource regions (0≤q≤1) and "$S_p$" indicates Tx power set to the overlap region. "1−q" represents a region other than the overlap region, from among resource regions, and "$S_N$" represents Tx power set to the region other than the overlap region. The effective SINR in Equation 1 refers to SINR considering Tx power controlled for the overlap region. "I" and "N" respectively indicate interference and noise. The UE may determine an MCS level and/or a coding rate of a transport block or a data packet transmitted through the corresponding uplink data channel on the basis of the effective SINR.

When the effective SINR is considered, the UE can set an accurate MCS level and apply adaptive modulation and coding (AMC), enhancing uplink data channel reception accuracy of the BS. The process of determining the effective SINR and deriving an MCS level may be performed by the BS as well as the UE.

To estimate link quality, SINR or SINR derived through cumulative average in consideration of reference signals transmitted for a predetermined period is used. To measure link quality by applying a Tx power value controlled as described above thereto, two methods may be provided. A subject that finally applies effective SINR and controls an MCS level can be the BS and/or the UE.

The first method applies a predetermined link quality value to an overlap region. The UE can respectively apply predetermined link quality offsets to the overlap region and a non-overlap region in order to derive link quality of the corresponding uplink data channel. The second method allocates independent channel estimation reference signals to the overlap region and other regions in uplink data channel resource regions.

4. Apparatus Configuration

Figure 10:
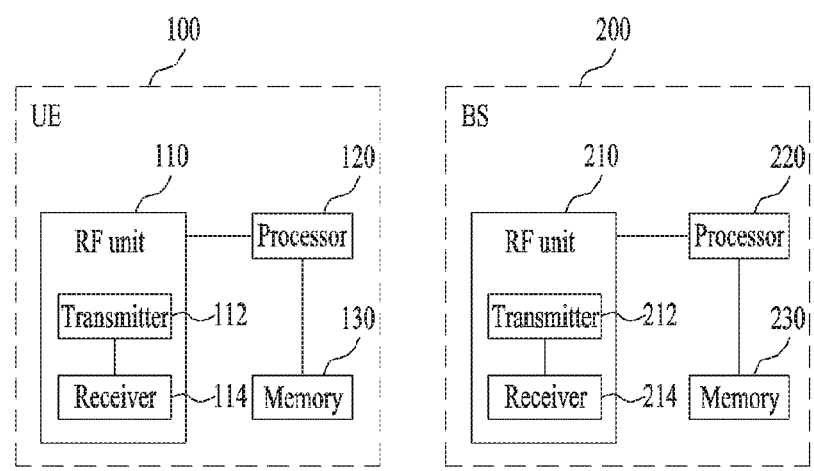
FIG. 10 is a block diagram of a UE and a BS according to an embodiment of the present invention.

FIG. 10 is a block diagram of a UE and a BS according to an embodiment of the present invention.

Referring to FIG. 10, a UE 100 and a BS 200 may respectively include radio frequency (RF) units 110 and 210, processors 120 and 220 and memories 130 and 230. While FIG. 10 shows one-to-one communication between the UE 100 and the BS 200, communication between a plurality of UEs and the BS 200 may be performed.

The RF units 110 and 210 may respectively include transmitters 112 and 212 and receivers 114 and 214. The transmitter 112 and the receiver 114 of the UE 100 may be configured to transmit/receive signals to/from the BS 200 and other UEs. The processor 120 of the UE 100 may be functionally connected to the transmitter 112 and the receiver 114 to control the transmitter 112 and the receiver 114 to transmit/receive signals to/from other devices. In addition, the processor 120 may process signals to be transmitted, transmit the processed signals to the transmitter 112 and process signals received by the receiver 114.

The processor 120 may store information included in an exchanged message in the memory 130 as necessary. The UE 100 having the aforementioned configuration may perform the aforementioned methods according to embodiments of the present invention.

The transmitter 212 and the receiver 214 of the BS 200 may be configured to transmit/receive signals to/from other BSs and UEs. The processor 220 of the BS 200 may be functionally connected to the transmitter 212 and the receiver 214 to control the transmitter 212 and the receiver 214 to transmit/receive signals to/from other devices. In addition, the processor 220 may process signals to be transmitted, transmit the processed signals to the transmitter 212 and process signals received by the receiver 214. The processor 220 may store information included in an exchanged message in the memory 230 as necessary. The BS 200 having the aforementioned configuration may perform the aforementioned methods according to embodiments of the present invention.

The processors 120 and 220 of the UE 100 and the BS 200 control (e.g. adjust and manage) operations of the UE 100 and the BS 200. The processors 120 and 220 may be respectively connected to the memories 130 and 230 for storing program code and data. The memories 130 and 2130 are respectively connected to the processors 120 and 220 and store operating systems, applications and general files.

The processors 120 and 220 may be called controllers, microcontrollers, microprocessors, microcomputers or the like. The processors 120 and 220 may be implemented using hardware, firmware, software or a combination thereof. When embodiments of the present invention are implemented using hardware, application specific integrated circuits (ASICs), digital signal processors (DSPs), digital signal processing devices (DSPDs), programmable logic devices (PLDs), field programmable gate arrays (FPGAs), etc., which are configured to perform the present invention, may be included in the processors 120 and 220.

The aforementioned method may be implemented as programs executable in computers and executed in general computers that operate the programs using computer readable media. In addition, data used in the aforementioned method may be recorded in computer readable recording media through various means. It should be understood that program storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of transmitting uplink data by a UE in a full duplex radio (FDR) communication environment, comprising:
   determining an overlap region corresponding to a resource region of a downlink control channel received from a base station (BS) during FDR communication with the BS, from among resource regions for transmission of an uplink data channel;
   mitigating an influence of self-interference caused by uplink communication on the overlap region; and
   transmitting the uplink data channel through the overlap region in which the influence of self-interference has been mitigated and a region other than the overlap region, from among the resource regions for transmission of the uplink data channel,
   wherein the mitigating of self-interference comprises adjusting a modulation and coding scheme (MCS) level with respect to the overlap region in consideration of an effective signal-to-interference-and-noise ratio (SINR) determined on the basis of the following Equation, $$\text{effctive } SINR = \frac{S_P \cdot q + S_N \cdot (1-q)}{1+N},$$

wherein Sp indicates Tx power set to the overlap region, $S_N$ indicates Tx power set to the region other than the overlap region, q represents a ratio of the overlap region to the resource regions for transmission of the uplink data channel, I represents interference caused by FDR communication, and N represents noise caused by FDR communication.

2. The method according to claim 1, wherein the mitigating of self-interference comprises decreasing uplink transmit (Tx) power for the overlap region.

3. The method according to claim 2, wherein the mitigating of self-interference comprises controlling the uplink Tx power to be lower than a predetermined threshold value.

4. The method according to claim 2, wherein the mitigating of self-interference comprises controlling the uplink Tx power in consideration of self-interference cancellation performance of the UE.

5. The method according to claim 4, wherein the uplink Tx power increases as the self-interference cancellation performance increases.

6. The method according to claim 4, wherein the mitigating of self-interference comprises controlling the uplink Tx power in consideration of self-interference cancellation performance of the BS in addition to the self-interference cancellation performance of the UE.

7. The method according to claim 2, wherein the transmitting of the uplink data channel comprises transmitting information about the controlled uplink Tx power along with the uplink data channel.

8. The method according to claim 2,
   wherein the transmitting of the uplink data channel comprises allocating a channel estimation reference signal to the overlap region, the channel estimation reference signal being discriminated form that allocated to a region other than the overlap region,
   wherein the BS demodulates uplink data according to the controlled uplink Tx power by compensating for the uplink data channel transmitted through the overlap region through a channel estimated using the reference signal.

9. The method according to claim 1, wherein the MCS level with respect to the overlap region is an MCS level with lower efficiency than that for a region other than the overlap region.

10. A UE for transmitting uplink data in a full duplex radio (FDR) communication environment, the UE comprising:
    a transmitter;
    a receiver; and a processor connected to the transmitter and the receiver to transmit uplink data, wherein the processor:
- determines an overlap region corresponding to a resource region of a downlink control channel received from a base station (BS) during FDR communication with the BS, from among resource regions for transmission of an uplink data channel;
- mitigates an influence of self-interference caused by uplink communication on the overlap region; and
- controls the transmitter to transmit the uplink data channel through the overlap region in which the influence of self-interference has been mitigated and a region other than the overlap region, from among the resource regions for transmission of the uplink data channel, wherein the mitigation of self-interference comprises adjusting a modulation and coding scheme (MCS) level with respect to the overlap region in consideration of an effective signal-to-interference-and-noise ratio (SINR) determined on the basis of the following Equation, $$\text{effctive } SINR = \frac{S_p \cdot q + S_N \cdot (1-q)}{1+N},$$

wherein Sp indicates Tx power set to the overlap region, $S_N$ indicates Tx power set to the region other than the overlap region, q represents a ratio of the overlap region to the resource regions for transmission of the uplink data channel, I represents interference caused by FDR communication, and N represents noise caused by FDR communication.

* * * * *